US010756955B2

(12) United States Patent
Burford et al.

(10) Patent No.: US 10,756,955 B2
(45) Date of Patent: Aug. 25, 2020

(54) DYNAMIC THRESHOLDS FOR COMPUTER SYSTEM ALERTS

(71) Applicant: International Business Machines Corporation, Armonk, NY (US)

(72) Inventors: Richard A. Burford, Sandy, UT (US); Al Chakra, Apex, NC (US); Paul M. Smith, Raleigh, NC (US); Christopher R. Walker, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 14/949,940

(22) Filed: Nov. 24, 2015

(65) Prior Publication Data

US 2017/0149604 A1    May 25, 2017

(51) Int. Cl.
*G06F 15/16* (2006.01)
*H04L 12/24* (2006.01)

(52) U.S. Cl.
CPC ........ *H04L 41/0681* (2013.01); *H04L 41/142* (2013.01)

(58) Field of Classification Search
None
See application file for complete search history.

(56) References Cited

U.S. PATENT DOCUMENTS

| | | |
|---|---|---|
| 7,076,695 B2 | 7/2006 | McGee et al. |
| 8,291,460 B1 | 10/2012 | Peacock |
| 8,635,328 B2 | 1/2014 | Corley et al. |
| 9,406,079 B1 * | 8/2016 | Kerr ................... G06Q 30/0254 |
| 2004/0088406 A1 * | 5/2004 | Corley ................. H04L 41/064 709/224 |
| 2007/0185746 A1 | 8/2007 | Chieu et al. |
| 2011/0238376 A1 | 9/2011 | Dang et al. |

(Continued)

FOREIGN PATENT DOCUMENTS

WO    03096129 A1    11/2003

OTHER PUBLICATIONS

Lund-Jensen, Kasper, "Monitoring Systemic Risk Based on Dynamic Thresholds", International Monetary Fund (IMF) Working Paper, WP/12/159, Monetary and Capital Markets Department, pp. 1-35, Jun. 2012.

(Continued)

*Primary Examiner* — Padma Mundur
(74) *Attorney, Agent, or Firm* — Reza Sarbakhsh (57) ABSTRACT

A method for dynamically modifying thresholds for computer system alerts is provided. The method includes receiving alert notification criteria based on an initial set of threshold parameters including an initial set of rules and initial threshold values for monitored metrics associated with a computer system, monitoring the computer system for current values for the monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria. The initial set of rules includes one or more attributes and one or more schedules.

19 Claims, 5 Drawing Sheets

(56) References Cited

U.S. PATENT DOCUMENTS

| | | | |
|---|---|---|---|
| 2012/0173161 A1* | 7/2012 | Virkamaki | A61B 5/14532 |
| | | | 702/21 |
| 2013/0132551 A1 | 5/2013 | Bose et al. | |
| 2014/0005979 A1* | 1/2014 | Rao | G06F 11/3409 |
| | | | 702/179 |
| 2016/0105330 A1* | 4/2016 | Choudhary | G06F 16/903 |
| | | | 715/736 |

OTHER PUBLICATIONS

"Website Performance and Availability Montioring", elkMonitor, pp. 1-4, 2014 © Elk Fork Technologies Inc., <http://www.elkmonitor.com/>.

Mell et al., "The NIST Definition of Cloud Computing", National Institute of Standards and Technology, Special Publication 800-145, Sep. 2011, pp. 1-7.

* cited by examiner

FIG. 5

DYNAMIC THRESHOLDS FOR COMPUTER SYSTEM ALERTS

BACKGROUND

The present invention generally relates to computer system alerts, and more particularly to dynamically setting thresholds for computer system alerts.

Operations analysts at large data centers may be constantly alerted to problems by software monitoring the computer systems associated with the data centers. Many of the alerts may not be helpful due to the dynamic environment of a typical data center, and an alert for an event may be considered a problem on a Monday at 9:00 AM but may not be considered a problem on a Thursday at 7:00 PM. Products may allow a user to set a threshold value for various key performance indicators (KPIs); however, the threshold values may be hardcoded in the product. Users monitoring the alerts may not appreciate the severity of an alert because the basis for the alert may be a value (e.g., a threshold) that does not apply to the time/situation when the KPI was monitored. On the other hand, an extensive list of threshold values to account for numerous times/situations may be unmanageable, e.g., for updating. Users monitoring the computer systems may consider certain alerts ones that can be safely ignored because the current date and time associated with the alert may reflect a workload and stress on the system that is different from the workload and stress the alert was designed for. As such, the usefulness of the alerts (and monitoring system) may be reduced, or an important, genuine alert may be hidden among a large number of unimportant alerts.

SUMMARY

According to one embodiment, a method for dynamically modifying thresholds for computer system alerts is provided. The method may include receiving alert notification criteria based on an initial set of threshold parameters, and the initial set of threshold parameters includes an initial set of rules and initial threshold values for monitored metrics associated with a computer system, monitoring the computer system for current values for the monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria. The initial set of rules may include one or more attributes, and one or more schedules.

According to another embodiment, a computer program product for dynamically modifying thresholds for computer system alerts is provided. The computer program product may include at least one computer readable non-transitory storage medium having computer readable program instructions for execution by a processor. The computer readable program instructions include instructions for receiving alert notification criteria based on an initial set of threshold parameters including an initial set of rules and initial threshold values for monitored metrics associated with a computer system, monitoring the computer system for current values for the monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria.

According to another embodiment, a computer system for dynamically modifying thresholds for computer system alerts is provided. The system may include at least one processing unit, at least one computer readable memory, at least one computer readable tangible, non-transitory storage medium, and program instructions stored on the at least one computer readable tangible, non-transitory storage medium for execution by the at least one processing unit via the at least one computer readable memory. The program instructions include instructions for receiving alert notification criteria based on an initial set of threshold parameters including an initial set of rules and initial threshold values for monitored metrics associated with a computer system, monitoring the computer system for current values for the monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-5, like numerals being used for like and corresponding parts of the various drawings.

According to one embodiment, provided is a method for dynamically modifying thresholds for computer system alerts by receiving alert notification criteria based on an initial set of threshold parameters, monitoring the computer system for current values for monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria. In one embodiment, the method may further include continually monitoring the computer system and determining further calculated threshold values for the monitored metrics, and modifying the alert notification criteria based on or more of the further calculated threshold values.

The method, computer program products, and systems disclosed herein may decrease the generation of computer system alerts, and in particular those alerts that may not be important, by dynamically adjusting the thresholds that may form the basis for computer system alerts. The threshold value of an alert may be dynamically adjusted to conform to the dynamic behavior of the workloads and stresses placed on the computer system. The monitoring software may apply the most appropriate threshold for a given time when comparing and analyzing a currently monitored value for a given metric, thereby reducing false positive alerts triggered by an unimportant event under an inappropriate threshold.

A user may provide initial threshold information (e.g., via a template), which may define various threshold parameters, and those threshold parameters may be redefined over time by factoring in workload variations and/or system performance over time. The user may define a policy or set variable threshold values that may be enforced at various time points or during various time periods, and the threshold values may be updated automatically. Dynamically updating thresholds may allow for a more intelligent monitoring of key performance indicators (KPIs)/attributes by preventing the generation of false positive alerts.

Figure 1:
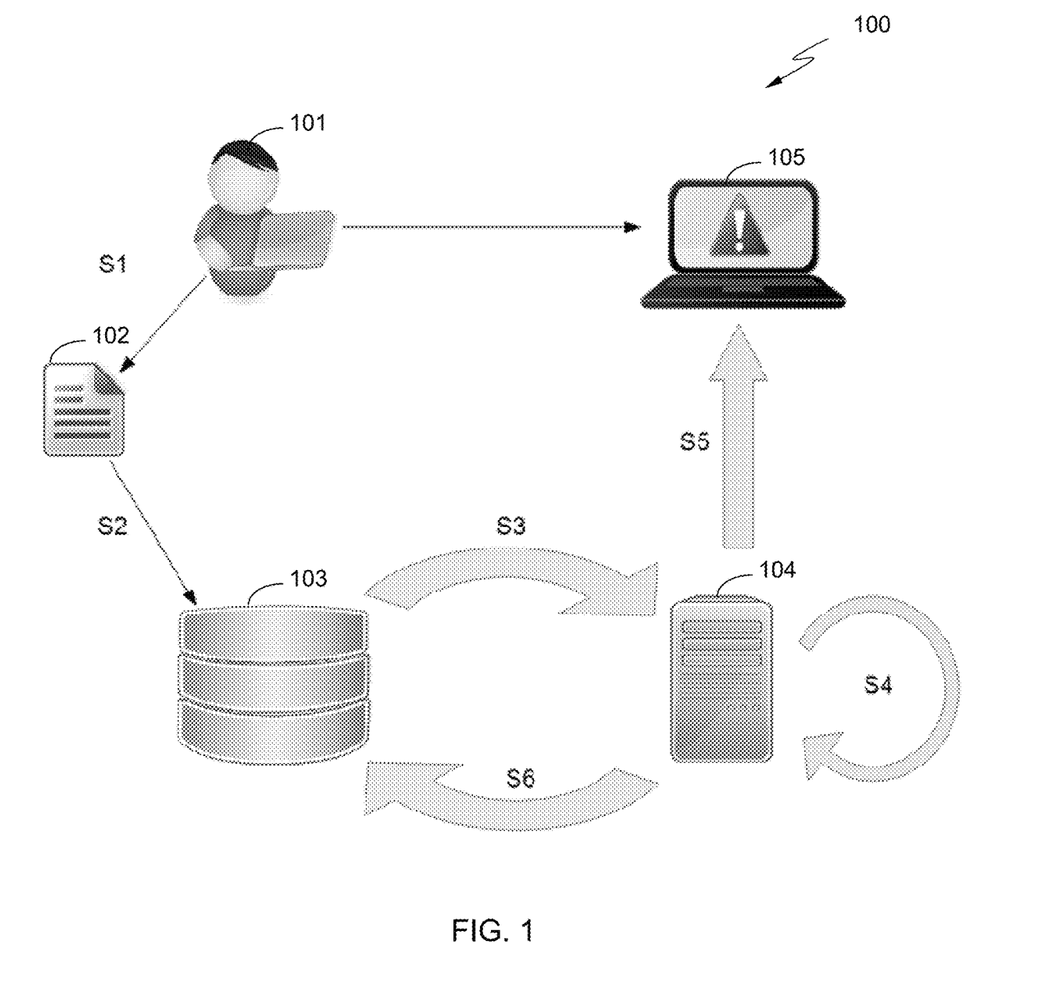
FIG. 1 is a block diagram illustrating an exemplary method for dynamically modifying thresholds for computer system alerts, according to an embodiment.

FIG. 1 illustrates an exemplary system 100 depicting a method for dynamically modifying thresholds for computer system alerts, according to an embodiment. At S1, a user 101 may prepare an initial set of threshold parameters 102, which may be used to monitor the performance and/or health of a computer system. The initial set of threshold parameters 102 may include an initial set of rules and initial threshold values for monitored metrics associated with the computer system. The initial set of threshold parameters 102 may be based on an initial template defined by user 101 and may be redefined by workload and/or system performance over time.

The initial set of rules may include attributes to monitor, e.g., particular KPIs. Such attributes may include any known or contemplated KPI including, but not limited to, current average response time for a computer system or network process, CPU utilization, available storage. The attributes may include composite attributes, which may be derived from two or more attributes. The two or more attributes may be considered contributing attributes, and the contribution of each contributing attribute may be weighted. The weighting may be predetermined, e.g., set by user 101.

Importantly, the attributes may be dynamic in the sense that a current measured metric or value associated with the attribute may change over time. Composite attributes may change over time in a variety of ways including a change in the weighting of the contributing attributes. For example, during a first time period, a first contributing attribute may have increased influence on the composite attribute, but during a second time period, the first contributing attribute may have decreased influence on the composite attribute. Such emphasis and deemphasize at different time points may be predetermined, e.g., by user 101, and may be included with the initial set of rules. The composition of the composite attributes may also change over time. For example, during a first time period, the composite attribute may comprise a first and a second contributing attribute, but during a second time period, the composite attribute may comprise the first, the second, and a third contributing attribute. It will be appreciated that the variation of a composite attribute over time is not limited to the examples disclosed herein, and other variations are contemplated and considered within the scope of this disclosure.

The initial set of rules may include one or more schedules, e.g., monitoring schedules, which may provide time points or time periods to monitor metrics associated with the monitored computer system. A schedule, when applied by a monitoring software, may provide visibility of current values of dynamic attributes that change over time. The schedule, e.g., date, time, duration, frequency, etc., for monitoring a computer system may be predetermined, e.g., by user 101.

The initial set of rules may include workload criteria, which may provide workload information that may influence how the monitoring software observes a computer system, and may contribute to how attributes are evaluated. Workload criteria may include a number of users on the computer system (e.g., during particular time periods), types of workloads (e.g., users requiring high-order processing resources, users requiring low-order processing resources, users requiring access to a particular database or specific network resource), and other criteria that may characterize the workload anticipated on a given system during a given time period.

The initial set of threshold parameters may include initial threshold values for metrics to be monitored. The initial threshold values may be values, ranges, etc., and may be provided based on observations/calculations of past performance, estimated performance/limitations, or other expectations. The initial threshold value may be derived from other provided information. For example, in one embodiment, the initial set of rules may include a source location from which one or more (initial) threshold values may be extracted. The source location may include, but is not limited to, a value in a storage location, an entry in a file, etc.

In one embodiment, the initial set of threshold parameters 102 may be provided to a monitoring system with a user interface.

At S2, the initial set of threshold parameters 102 may be provided to a database 103. Database 103 may store the initial set of rules and initial threshold values (included in the initial set of threshold parameters 102). Database 103 may store additional information and/or allow updating of stored information, e.g., updated threshold values, metrics, rules, preferences, etc. Database 103 may also store a current state of alert notification criteria. Such alert notification criteria may form a basis with which a monitoring system may generate a computer system alert.

At S3, the initial set of threshold parameters 102 may be used to monitor computer system 104, e.g., forming a basis to monitor various metrics. The initial set of threshold parameters 102 may, e.g., be provided to a portion of the monitoring system responsible for monitoring computer system metrics. In one embodiment, the initial set of threshold parameters 102 may form the basis for one or more queries to run on the monitored system. At S3, a current state of alert notification criteria may be provided to a portion of the monitoring system responsible for generating a computer system alert.

At S4, computer system 104 may be monitored for current values of monitored metrics. In one embodiment, a monitoring system (e.g., via monitoring software) may utilize the initial set of threshold parameters 102 to monitor metrics of the computer system. The monitoring system may determine calculated threshold values for the monitored metrics based on a statistical analysis between the current values for the monitored metrics and the initial set of threshold parameters. For example, a given initial threshold value for a given metric at a given time may not be validated by observed instances for the given metric at the given time. Instead, by applying statistical analyses (e.g., standard deviations, machine learning, other algorithms known in the art) to the monitored metrics (and based on the initial threshold parameters) a more accurate threshold value for the given metric may be calculated. Monitoring may be a continuous process, or a repetitive process. In one embodiment, the monitoring is based on the schedules provided in the initial set of threshold parameters 102.

At S5, the monitoring system may generate an alert based on an alert notification criteria and a current value of a monitored metric. For example, if the alert notification criteria dictates that an alert is to be generated when a first threshold value for a monitored metric is exceeded by a predetermined amount, in response to observing a current value exceeding the predetermined amount, an alert is generated and, e.g., provided to user computer 105. In a first instance, the first threshold value may be included in the initial threshold values provided in the initial set of threshold parameters. In other instances, the first threshold value may be a calculated threshold value determined by the monitoring system.

At S6, calculated threshold values for the monitored metrics may be provided to database 103. In one embodiment, alert notification criteria may be updated with the calculated threshold values. In one embodiment, the alert notification criteria may be automatically modified based on the calculated threshold values and an initial alert notification criteria rule. For example, an initial alert notification criteria rule may dictate that an initial (or previously set, e.g., previously calculated) threshold value in the alert notification criteria be updated with a calculated threshold value if the calculated threshold value deviates from the initial (or previously set) threshold value beyond a predetermined amount.

In another embodiment, the alert notification criteria may be modified based on a user instruction to modify the alert notification criteria. For example, a user may be provided an amount that a calculated threshold value deviates from an initial (or previously set) threshold value. Based on this information (which may be provided in the form of a calculated threshold value deviation notice), the user may provide an instruction to modify the alert notification criteria by, e.g., updating the initial (or previously set) threshold value to the calculated threshold value.

Figure 2:
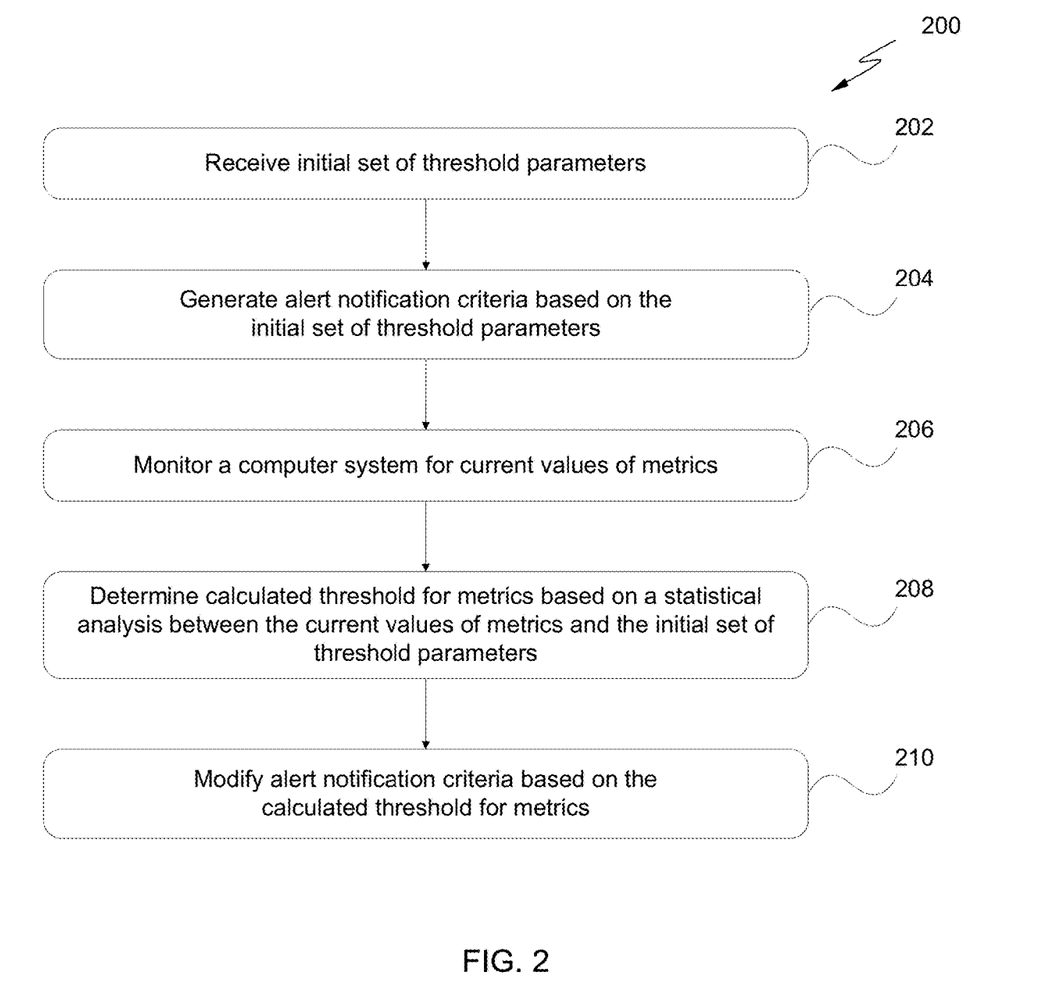
FIG. 2 is a flowchart illustrating an exemplary method for dynamically modifying thresholds for computer system alerts, according to an embodiment.

FIG. 2 illustrates a flowchart 200 depicting an exemplary method for dynamically modifying thresholds for computer system alerts, according to an embodiment. At 202, an initial set of threshold parameters are received. The initial set of threshold parameters may include an initial set of rules and initial threshold values for monitored metrics (e.g., metrics associated with attributes to be monitored) associated with a computer system. The initial set of rules may include one or more attributes (e.g., identifications of one or more attributes to be monitored), one or more schedules (e.g., for monitoring attributes, metrics, etc.), and workload criteria.

Attributes may include any KPIs known or utilized in the art, e.g., current average response time, CPU utilization, available storage. The attributes may be dynamic, i.e., having values (and thresholds) that vary over time.

In one embodiment, the initial threshold parameters include an initial set of rules that may remain constant and initial threshold values that may be updated, e.g., with other threshold values that conform better to the observed behavior of a computer system, and in particular, with respect to specific time points or time periods in a dynamic environment.

At 204, alert notification criteria may be generated based on the initial set of threshold parameters. For example, a user may provide the initial set of threshold parameters via a template that may facilitate the generation of criteria that may form the basis of a computer alert. In one example, a user template may request information that may form the basis of the initial set of threshold parameters, e.g., a first attribute to monitor, a first time to monitor the first attribute, an initial threshold for the first attribute at the first time, and parameters for triggering an alert. The user may provide a deviation amount (e.g., a percentage above/below) a threshold, which may trigger an alert. It will be appreciated that the initial threshold may be a best guess or expected threshold level for a given attribute at a given time (or series of time periods), and the initial threshold may be updated with a more appropriate threshold value as the monitoring system learns (e.g., by monitoring and observing) the attribute(s) (and associated metrics).

In an alternative embodiment, instead of receiving an initial set of threshold parameters (e.g., step 202) and generating an alert notification criteria based on the initial set of threshold parameters (e.g., step 204), the alert notification criteria based on the initial set of threshold parameters may be received. In a further embodiment, the alert notification criteria and the initial set of threshold parameters may both be received.

At 206, the subject computer system may be monitored for current values of metrics to be monitored. The metrics to be monitored may be identified in the initial set of thresholds, and the timing for the monitoring may be based on the schedules provided in the initial set of threshold. The current values may be recorded, stored, analyzed, and/or otherwise used in learning the dynamic nature of the computer system's varying workload and performance.

At 208, calculated threshold values for the monitored metrics may be determined based on statistical analyses between the current values for the monitored metrics and the initial set of threshold parameters. In one example, a calculated threshold value may be determined by analyzing the standard deviation of current values from the initial threshold values. It will be appreciated that each dynamic attribute/metric may have various average values during the course of the day, week, month, year, etc. It will also be appreciated that the pattern of average values for a given dynamic metric may be modelled using any methodology known or contemplated and thresholds (which may justify alert notification) for specific time points for the pattern may be derived from the various models.

It is contemplated that calculated threshold values may be determined for a monitored metric and may correspond to a respective initial threshold value. The calculated threshold values may provide various levels of improvement over corresponding initial threshold values. Such improvements may be quantified in terms of amount of deviation. The amount of improvement that a calculated threshold value may determine whether the calculated threshold value is a significant improvement over the initial (or previously set) threshold value. For example, a deviation of less than 0.1% may not justify updating the initial (or previously set) threshold value. However, it is contemplated that any detectable amount of change (i.e., closer to the modeled value) may justify updating the initial (or previously set) threshold value.

At 210, the alert notification criteria may be updated based on one or more of the calculated threshold values. In one embodiment, the alert notification criteria may be modified based on at least one of an initial alert notification criteria rule or a user instruction to modify the alert notification criteria. For example, an initial alert notification criteria rule may dictate that an initial (or previously set) threshold value must be updated with a new calculated threshold value when a predetermined deviation amount is exceeded. The initial alert notification criteria rule may be provided by a user, e.g., via a user interface, when providing the initial threshold parameters.

In another example, a user may effectuate the modification of the alert notification criteria by providing a user instruction to modify the alert notification criteria. The amount of deviation between a newly calculated threshold value and an initial (or previously set) threshold value may be provided to a user and the user may decide whether to update the alert notification criteria with the newly calculated threshold value, e.g., by providing the user instruction to modify the alert notification criteria.

The thresholds (e.g., for the attribute values or KPIs) and the associated metrics to be monitored may vary in complexity and may be based on the initial threshold parameters. When various thresholds represent differing complexity, a monitoring system (e.g., the monitoring software) may determine which threshold (and rules) to apply, e.g., in an alert notification criterion. For example, a simple rule (e.g., for timing) may apply to a first metric, such as "Monday at 0900" and a more complex rule (e.g., for timing) may apply to the same metric, such as "Final Monday of Month at 0900." The monitoring software may determine that the more complex rule will have a higher priority, and the monitoring software may act on the threshold associated with the more complex rule.

In one embodiment, a threshold value (e.g., a calculated threshold value) may remain in effect until a new threshold value (e.g., a further calculated threshold value) is observed or calculated. In another embodiment, the new threshold value may be presented to a user and the user may determine whether the new threshold value is more appropriate than the currently set threshold value.

Table 1 below provides a non-limiting example of a monitored metric over the course of predetermined time periods. It will be appreciated that other and more or less complex metrics may be monitored and calculated.

TABLE 1

| Time slot (user specified) | Initial threshold value (user specified) | Historical threshold (calculated) | Current value |
|---|---|---|---|
| 00:01-06:00 MON | 1.00 | 0.82 | 0.81 |
| 06:01-08:00 MON | 0.95 | 0.85 | 0.86 |
| 08:01-10:00 MON | 0.90 | | |
| 10:01-12:00 MON | 0.85 | | |
| 12:01-13:00 MON | 0.90 | | |
| 13:01-15:00 MON | 0.95 | | |
| 15:01-18:00 MON | 1.00 | | |
| 18:01-00:00 MON | 1.5 | | |
| . . . | | | |

Table 1 includes, in the first column, various time slots (e.g., time periods) a particular metric is to be monitored. These values may be specified by a user, e.g., as part of the initial set of threshold parameters. The second column may reflect initial threshold values specified by the user, e.g., as part of the initial set of threshold parameters. The third column may reflect historical (or calculated) threshold values and the fourth column may reflect currently observed values for the monitored metric.

Based on the alert notification criteria, an alert may be generated in the second instance (when the current value, 0.86, is above the calculated value, 0.85). As discussed above, the alert notification criteria may be modified to update the initial threshold values with (or otherwise apply) the calculated threshold values. To account for learning and adaptive modelling, current values that exceed a threshold may not necessarily trigger an alert notification and may instead form the basis of a new calculated threshold.

In one embodiment, the initial set of threshold parameters further includes the initial alert notification criteria rule.

In one embodiment, the initial alert notification criteria rule includes an instruction to modify the alert notification criteria based on a calculated threshold value exceeding a predetermined deviation amount from an initial threshold value (e.g., an initial threshold value corresponding to the calculate threshold value). For example, a monitoring system applying the initial alert notification criteria rule may effectuate a modification of the alert notification criteria if a calculated threshold value was more or less than the initial (or previously set) threshold value (e.g., for a given metric) by a predetermined amount.

In one embodiment, the method further includes providing a calculated threshold value deviation notice, wherein the calculated threshold value deviation notice indicates a deviation amount between the calculated threshold value and the initial threshold value. In some instances, a minor deviation between a calculated threshold value and an initial (or previously set) threshold may not justify an automatic modification. In such instances, it is contemplated that a calculated threshold value deviation notice may be provided when the calculated threshold value deviates from the initial (or previously set) threshold above or below a predetermined amount. The predetermined amount of deviation for the calculated threshold value deviation notice may be provided with the initial set of threshold parameters, e.g., as another initial notification criteria rule.

In one embodiment, the method may further include providing a user interface, which a user may use to provide the user instruction to modify the alert notification criteria. The user may provide the initial set of threshold parameters via the user interface. The user interface may provide, e.g., to the user, the calculated threshold value deviation notice.

In one embodiment, the one or more attributes have multiple initial threshold values that differ at different time periods. One or more attributes (e.g., metrics to be monitored) may be dynamic and may have varying values over time. The initial threshold values may reflect an initial (or best guess) prediction for the behavior of the dynamic attribute/KPI over time.

In a further embodiment, the schedules include monitored time periods to monitor the computer system for the current values for the monitored metrics, and the monitored time periods include time periods associated with the one or more attributes (e.g., dynamic attributes/KPIs) having multiple initial threshold values that differ at different time periods.

In one embodiment, one or more attributes is a composite attribute derived from two or more contributing attributes. The current value of a composite attribute may be derived from current values for two or more contributing attributes. A user may emphasize or deemphasize contributions of contributing attributes to the composite attribute, and such emphasis and de-emphasis may vary over time, which may be reflected in rules provided in the initial set of threshold parameters.

In one embodiment, the initial set of rules further includes a source location to extract one or more initial threshold values, and the source location includes at least one of a value in storage, an entry in a file, and a value calculated on past performance.

In one embodiment, the method further includes determining further calculated threshold values for the monitored metrics based on a statistical analysis between the current values for the monitored metrics and the calculated threshold values for the monitored metrics, and modifying the alert notification criteria based on one or more of the further calculated threshold values and at least one of the initial alert notification criteria rule or the user instruction to modify the alert notification criteria.

In one embodiment, the initial set of rules further includes workload criteria.

In an alternative embodiment, a method for dynamically modifying thresholds for computer system alerts includes receiving an initial set of threshold parameters including an initial set of rules and initial threshold values for monitored metrics associated with a computer system, generating alert notification criteria based on the initial set of threshold parameters, monitoring the computer system for current values for the monitored metrics, determining calculated threshold values for the monitored metrics based on a statistical analysis between the current values for the monitored metrics and the initial set of threshold parameters, and modifying the alert notification criteria based on one or more of the calculated threshold values and at least one of an initial alert notification criteria rule or a user instruction to modify the alert notification criteria. The initial set of rules may include one or more attributes, and one or more schedules.

Embodiments disclosed and contemplated herein may be implemented and performed on a computing node, e.g., disclosed herein.

Figure 3:
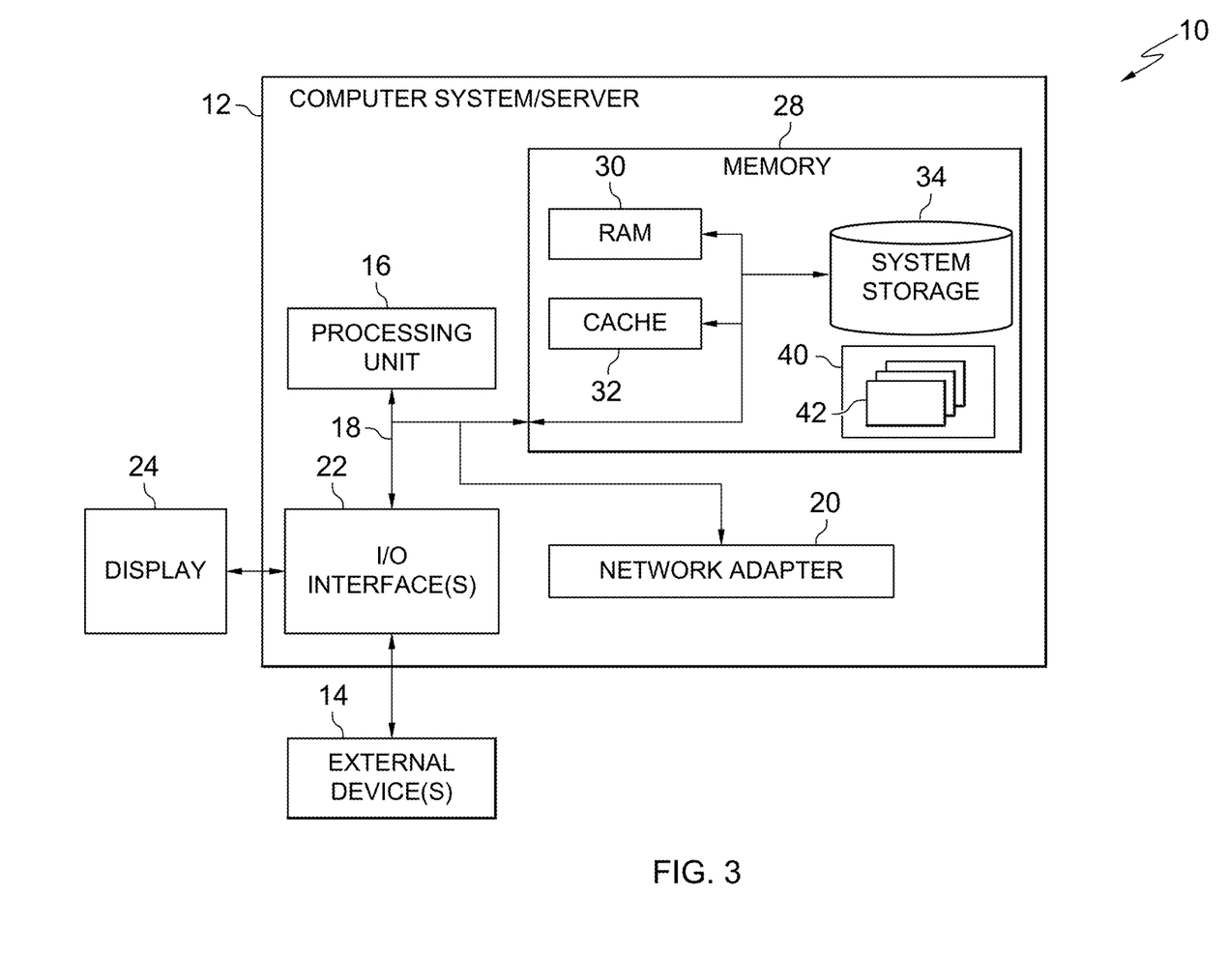
FIG. 3 is a block diagram illustrating a computing node, according to an aspect of the invention.

FIG. 3 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
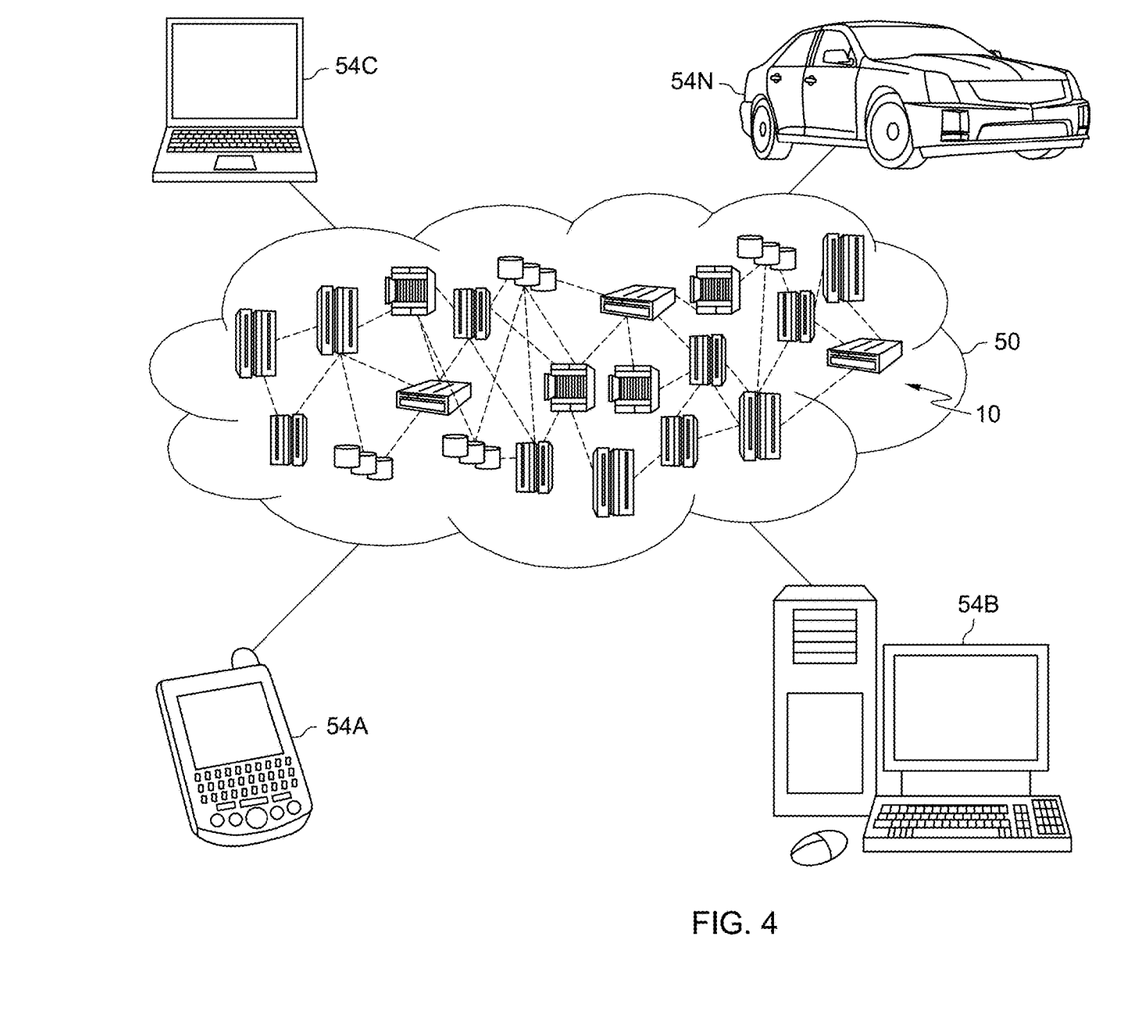
FIG. 4 depicts a cloud computing environment according to an embodiment of the present invention.

Referring now to FIG. 4, illustrative cloud computing environment 50 is depicted. As shown, cloud computing environment 50 comprises one or more (cloud) computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
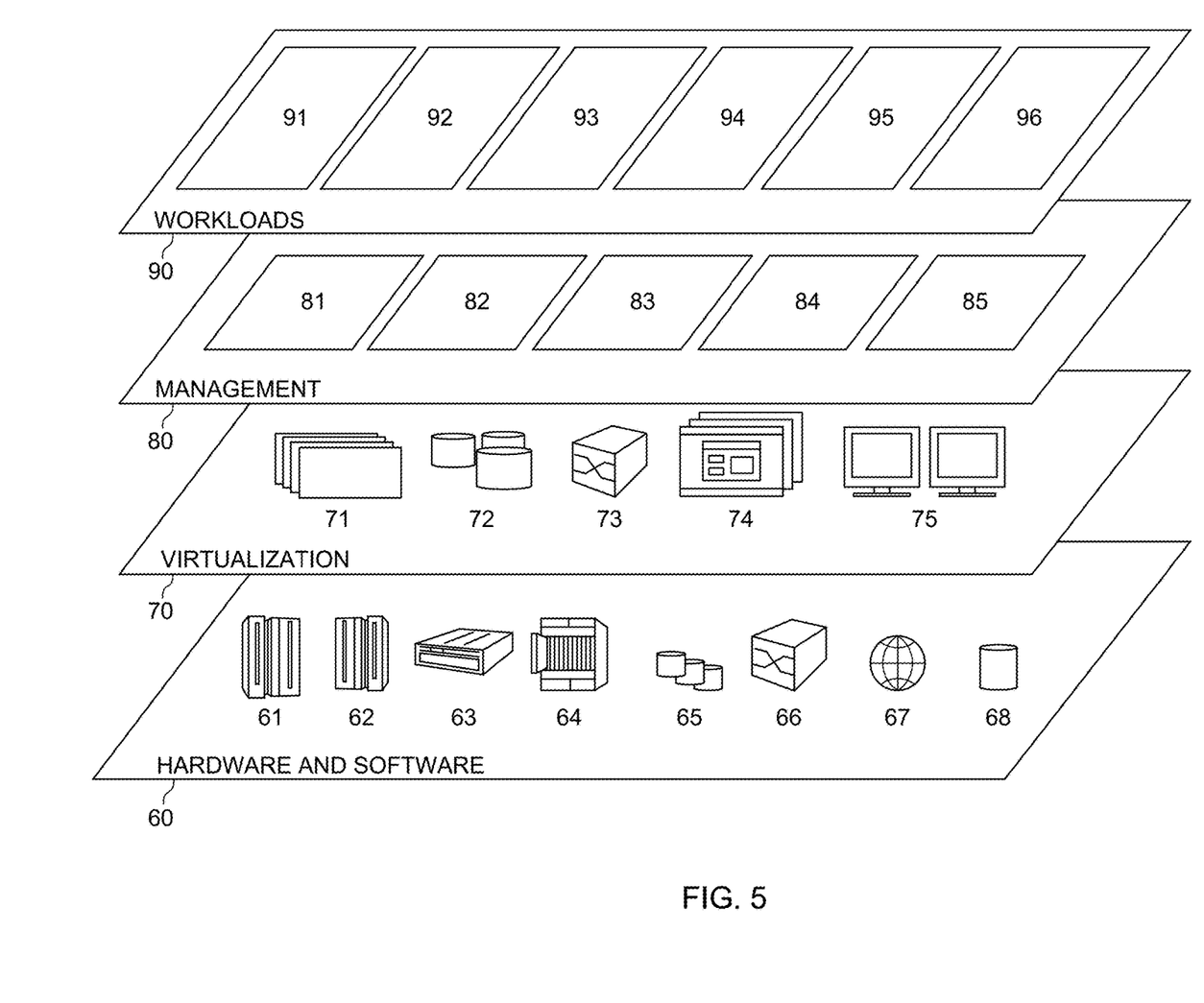
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Methods for dynamically modifying thresholds for computer system alerts may be performed in a cloud environment, e.g., in the hardware and software layer 60 and/or the virtualization layer 70.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically modifying thresholds for computer system alerts, the method comprising:
   receiving an initial set of threshold parameters comprising an initial set of rules and initial threshold values for monitored metrics associated with a computer system, wherein the initial set of rules comprises one or more composite attributes derived from two or more contributing attributes, one or more schedules, and workload criteria, wherein composition of the composite attributes and contributions of the contributing attributes to the composite attributes change from a first time period to a second time period;
   generating alert notification criteria based on the initial set of threshold parameters;
   monitoring the computer system for current values for the monitored metrics;
   determining calculated threshold values for the monitored metrics based on a statistical analysis between the current values for the monitored metrics and the initial set of threshold parameters;
   modifying the alert notification criteria based on one or more of the calculated threshold values and at least one of an initial alert notification criteria rule and a user instruction to modify the alert notification criteria; and
   generating an alert notification to a user based on modified alert notification criteria.

2. The method according to claim 1, wherein the initial set of threshold parameters further comprises the initial alert notification criteria rule.

3. The method according to claim 1, wherein the initial alert notification criteria rule comprises an instruction to modify the alert notification criteria based on a calculated threshold value exceeding a predetermined deviation amount from an initial threshold value.

4. The method according to claim 1, further comprising:
   providing a calculated threshold value deviation notice, wherein the calculated threshold value deviation notice indicates a deviation amount between the calculated threshold value and the initial threshold value.

5. The method according to claim 1, further comprising:
   providing a user interface, wherein a user may provide the user instruction to modify the alert notification criteria.

6. The method according to claim 1, wherein at least one of the one or more attributes have multiple initial threshold values that differ at different time periods.

7. The method according to claim 6, wherein the one or more schedules comprise monitored time periods to monitor the computer system for the current values for the monitored metrics, and wherein the monitored time periods include time periods associated with the one or more attributes having multiple initial threshold values that differ at different time periods.

8. The method according to claim 1, wherein the initial set of rules further comprises a source location to extract one or more initial threshold values, and wherein the source location comprises at least one of a value in storage, an entry in a file, and a value calculated on past performance.

9. The method according to claim 1, further comprising:
   determining further calculated threshold values for the monitored metrics based on a statistical analysis between the current values for the monitored metrics and the calculated threshold values for the monitored metrics; and
   modifying the alert notification criteria based on one or more of the further calculated threshold values and at least one of the initial alert notification criteria rule and the user instruction to modify the alert notification criteria.

10. A computer program product for dynamically modifying thresholds for computer system alerts, the computer program product comprising at least one computer readable non-transitory storage medium having computer readable program instructions thereon for execution by a processor, the computer readable program instructions comprising program instructions for:
    receiving an initial set of threshold parameters comprising an initial set of rules and initial threshold values for monitored metrics associated with a computer system, wherein the initial set of rules comprises one or more composite attributes derived from two or more contributing attributes, one or more schedules, and workload criteria, wherein composition of the composite attributes and contributions of the contributing attributes to the composite attributes change from a first time period to a second time period;
    generating alert notification criteria based on the initial set of threshold parameters;
    monitoring the computer system for current values for the monitored metrics;
    determining calculated threshold values for the monitored metrics based on a statistical analysis between the current values for the monitored metrics and the initial set of threshold parameters;
    modifying the alert notification criteria based on one or more of the calculated threshold values and at least one of an initial alert notification criteria rule and a user instruction to modify the alert notification criteria; and
    generating an alert notification to a user based on modified alert notification criteria.

11. The computer program product according to claim 10, wherein the initial set of threshold parameters further comprises the initial alert notification criteria rule.

12. The computer program product according to claim 10, wherein the initial alert notification criteria rule comprises an instruction to modify the alert notification criteria based on a calculated threshold value exceeding a predetermined deviation amount from an initial threshold value.

13. The computer program product according to claim 10, wherein the computer readable program instructions further comprise program instructions for:
    providing a calculated threshold value deviation notice, wherein the calculated threshold value deviation notice indicates a deviation amount between the calculated threshold value and the initial threshold value.

14. The computer program product according to claim 10, wherein the computer readable program instructions further comprise program instructions for:
    providing a user interface, wherein a user may provide the user instruction to modify the alert notification criteria.

15. A computer system for dynamically modifying thresholds for computer system alerts, the computer system comprising:
    at least one processing unit;
    at least one computer readable memory;
    at least one computer readable tangible, non-transitory storage medium; and program instructions stored on the at least one computer readable tangible, non-transitory storage medium for execution by the at least one processing unit via the at least one computer readable memory, wherein the program instructions comprise program instructions for:
    receiving an initial set of threshold parameters comprising an initial set of rules and initial threshold values for monitored metrics associated with a computer system, wherein the initial set of rules comprises one or more composite attributes derived from two or more contributing attributes, one or more schedules, and workload criteria, wherein composition of the composite attributes and contributions of the contributing attributes to the composite attributes change from a first time period to a second time period;
    generating alert notification criteria based on the initial set of threshold parameters;
    monitoring the computer system for current values for the monitored metrics;
    determining calculated threshold values for the monitored metrics based on a statistical analysis between the current values for the monitored metrics and the initial set of threshold parameters;
    modifying the alert notification criteria based on one or more of the calculated threshold values and at least one of an initial alert notification criteria rule and a user instruction to modify the alert notification criteria; and
    generating an alert notification to a user based on modified alert notification criteria.

16. The computer system according to claim 15, wherein the initial set of threshold parameters further comprises the initial alert notification criteria rule.

17. The computer system according to claim 15, wherein the initial alert notification criteria rule comprises an instruction to modify the alert notification criteria based on a calculated threshold value exceeding a predetermined deviation amount from an initial threshold value.

18. The computer system according to claim 15, wherein the program instructions further comprise program instructions for:
    providing a calculated threshold value deviation notice, wherein the calculated threshold value deviation notice indicates a deviation amount between the calculated threshold value and the initial threshold value.

19. The computer system according to claim 15, wherein the program instructions further comprise program instructions for:
    providing a user interface, wherein a user may provide the user instruction to modify the alert notification criteria.

* * * * *